(12) United States Patent
Chen et al.

(10) Patent No.: US 11,172,718 B2
(45) Date of Patent: Nov. 16, 2021

(54) WEARABLE DISPLAY DEVICE

(71) Applicant: Quanta Computer Inc., Taoyuan (TW)

(72) Inventors: Chun-Lung Chen, Taoyuan (TW);
Yuan-Peng Yu, Taoyuan (TW);
Wei-Jen Chang, Taoyuan (TW);
Hung-Chieh Wu, Taoyuan (TW)

(73) Assignee: QUANTA COMPUTER INC.,
Taoyuan (TW)

( * ) Notice: Subject to any disclaimer, the term of this patent is extended or adjusted under 35 U.S.C. 154(b) by 300 days.

(21) Appl. No.: 16/385,566

(22) Filed: Apr. 16, 2019

(65) Prior Publication Data

US 2020/0214381 A1  Jul. 9, 2020

(30) Foreign Application Priority Data

Jan. 4, 2019  (TW) .................................. 108100437

(51) Int. Cl.
*A42B 1/245* (2021.01)
*G02B 27/01* (2006.01)
*G02B 6/00* (2006.01)
*G02C 3/02* (2006.01)

(52) U.S. Cl.
CPC ................ *A42B 1/245* (2013.01); *G02B 6/00* (2013.01); *G02B 27/0172* (2013.01); *G02B 27/0176* (2013.01); *G02C 3/02* (2013.01); *G02B 2027/0154* (2013.01)

(58) Field of Classification Search
CPC .......... A42B 1/245; A42B 1/247; G02C 3/02; G02B 27/0176; G02B 6/00; G02B 27/0172; G02B 27/0081; G02B 2027/0154

USPC ........................................................ 2/209.13
See application file for complete search history.

(56) References Cited

U.S. PATENT DOCUMENTS

| 4,819,274 | A | * | 4/1989 | Day | A42B 1/247 |
| | | | | | 2/10 |
| 5,261,124 | A | * | 11/1993 | Day | G02C 3/02 |
| | | | | | 2/10 |
| 5,533,207 | A | * | 7/1996 | Diaz | A42B 1/247 |
| | | | | | 2/10 |
| 10,935,811 | B2 | * | 3/2021 | Asemani | F16M 11/14 |
| 2004/0008157 | A1 | * | 1/2004 | Brubaker | G02B 27/017 |
| | | | | | 345/8 |
| 2005/0083579 | A1 | * | 4/2005 | Volkenandt | G02B 27/0176 |
| | | | | | 359/630 |
| 2006/0037125 | A1 | * | 2/2006 | McDowell | G02B 7/002 |
| | | | | | 2/209.13 |
| 2007/0118972 | A1 | * | 5/2007 | Fang | A42B 1/247 |
| | | | | | 2/209.13 |

(Continued)

FOREIGN PATENT DOCUMENTS

| CN | 103309035 A | 9/2013 |
| CN | 105866957 A | 8/2016 |

(Continued)

*Primary Examiner* — Jocelyn Bravo
(74) *Attorney, Agent, or Firm* — Rabin & Berdo, P.C.

(57) ABSTRACT

A wearable display device includes a wearing device, a linking-lever set, a bracket and an optical imaging device. The linking-lever set includes a first rod and a second rod, and the first rod is pivotally connected to the wearing device and the second rod, respectively. The bracket is fixedly connected to the optical imaging device, and is pivotally connected to the second rod of the at least one linking-lever set.

9 Claims, 8 Drawing Sheets

(56) References Cited

U.S. PATENT DOCUMENTS

2009/0303588 A1* 12/2009 Charlesworth ........ G02B 7/002
                                                               359/481
2014/0340285 A1* 11/2014 Hiraide .............. G02B 27/0179
                                                                 345/8
2020/0064652 A1* 2/2020 Asemani .................. G02C 5/02

FOREIGN PATENT DOCUMENTS

| CN | 106707508 A | 5/2017 |
|---|---|---|
| CN | 206760872 U | 12/2017 |
| JP | 2016-192630 A | 11/2016 |
| TW | 594658 B | 6/2004 |
| TW | 201643504 A | 12/2016 |
| WO | WO-2008/096719 A1 | 8/2008 |

* cited by examiner

WEARABLE DISPLAY DEVICE

RELATED APPLICATIONS

This application claims priority to Taiwan Application Ser. No. 108100437, filed Jan. 4, 2019, which is herein incorporated by reference.

BACKGROUND

Field of Disclosure

The disclosure relates to a wearing device. More particularly, the disclosure relates to a wearable display device.

Description of Related Art

With the improvement of technology, a wearable display device for Augmented Reality (AR) has been gradually popular in the marketplace. Normally, the wearable display device includes an optical imaging device. The user can see display images through the optical imaging device.

However, the current optical imaging device is fixedly arranged in front of the user's eyes, and is unable to be adjusted the position in accordance to the user's eyes.

SUMMARY

In one embodiment of the disclosure, a wearable display device is provided for solving the problems mentioned in the prior art.

In one embodiment of the disclosure, a wearable display device provided includes a wearing device, a bracket, an optical imaging device and at least one linking-lever set. The linking-lever set includes a first rod and a second rod, and the first rod is pivotally connected to the wearing device and the second rod, respectively. The bracket is fixedly connected to the optical imaging device, and is pivotally connected to the second rod of the linking-lever set.

According to one or more embodiments of the disclosure, in the wearable display device, the wearing device includes a wearing portion and a hat body. The hat body is connected to the wearing portion, and provided with a hat brim portion and an opening formed on a bottom surface of the hat brim portion. The linking-lever set is located in the opening, and the optical imaging device projects outwards from the bottom surface of the hat brim portion through the opening.

According to one or more embodiments of the disclosure, in the wearable display device, the optical imaging device is completely located out of the opening of the hat body, and is able to be rotated for flat contacting with the bottom surface of the hat brim portion.

According to one or more embodiments of the disclosure, in the wearable display device, the hat brim portion is formed with an accommodating recess therein, and the accommodating recess is in communication with the opening of the hat body. The optical imaging device is able to be completely moved into the accommodating recess from the opening by the linking-lever set.

According to one or more embodiments of the disclosure, in the wearable display device, the bracket is provided with a pivoting member, the wearing device is provided with a pivoting base, the first rod includes a first end and a second end which are opposite to each other, the second rod includes a third end and a fourth end which are opposite to each other. The first end of the first rod is pivotally connected to the third end of the second rod through a first pivot shaft, the second end of the first rod is pivotally connected to the pivoting base through a second pivot shaft, and the fourth end of the second rod is pivotally connected to the pivoting member through a third pivot shaft.

According to one or more embodiments of the disclosure, in the wearable display device, the linking-lever set further includes a first cushion ring and a second cushion ring. The first cushion ring is sandwiched between the pivoting base and the first rod, and the second cushion ring is sandwiched between the first rod and the second rod.

According to one or more embodiments of the disclosure, in the wearable display device, the linking-lever set further includes a third cushion ring. The third cushion ring is sandwiched between the pivoting member and the second rod.

According to one or more embodiments of the disclosure, in the wearable display device, the linking-lever set is two in number, the linking-lever sets are respectively located on two opposite sides of the bracket.

According to one or more embodiments of the disclosure, in the wearable display device, the optical imaging device includes an outer casing, a display source and an optical element. The outer casing is fixedly connected to the bracket. The display source is fixedly connected to the outer casing. The optical element includes a light-transmission plate and a waveguide structure. The light-transmission plate is fixedly connected to the outer casing, and optically coupled to the display source. The waveguide structure is disposed in the light-transmission plate. The light-transmission plate is used to guide lights of the display source to the waveguide structure, and the waveguide structure is used to guide the lights in the light-transmission plate out from the light-transmission plate.

In one embodiment of the disclosure, a wearable display device provided includes a wearing device, a bracket, an optical imaging device and at least one linking-lever set. The wearing device includes a pivoting base, an accommodating recess and an opening formed on a bottom surface of the wearing device and being in communication with the accommodating recess. The optical imaging device is fixedly connected to the bracket, and projects outwards from the bottom surface of the wearing device through the opening. The linking-lever set is located in the accommodating recess, and extends outwards from the opening. The linking-lever set includes a plurality of rods in which each two adjacent ones of the rods are pivotally connected to each other, and an initial one and a final one of the rods are pivotally connected to the bracket and the pivoting base, respectively. The rods of the linking-lever set are not less than two in number.

With the structure described in the above embodiments, the optical imaging device of the wearable display device can be correspondingly adjusted to align with the user's eyes, thereby increasing the willingness of the user to use the wearable display device.

The above description is merely used for illustrating the problems to be resolved, the technical methods for resolving the problems and their efficacies, etc. The specific details of the disclosure will be explained in the embodiments below and related drawings.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure. In the drawings.

DESCRIPTION OF THE EMBODIMENTS

Reference will now be made in detail to the present embodiments of the disclosure, examples of which are illustrated in the accompanying drawings. Wherever possible, the same reference numbers are used in the drawings and the description to refer to the same or like parts. According to the embodiments, it will be apparent to those skilled in the art that various modifications and variations can be made to the structure of the disclosure without departing from the scope or spirit of the disclosure.

Figure 1:
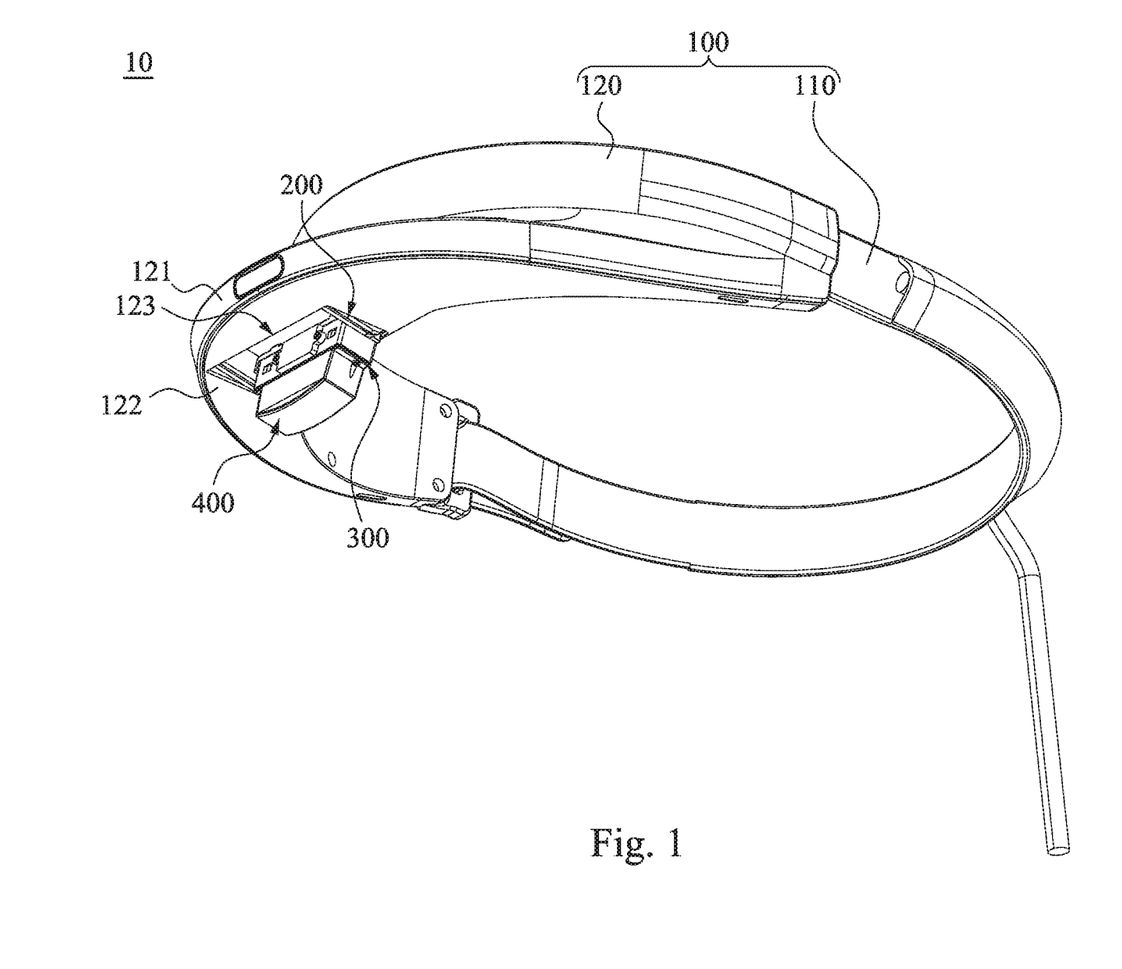
FIG. 1 is a perspective view of a wearable display device according to one embodiment of the disclosure.
Figure 2:
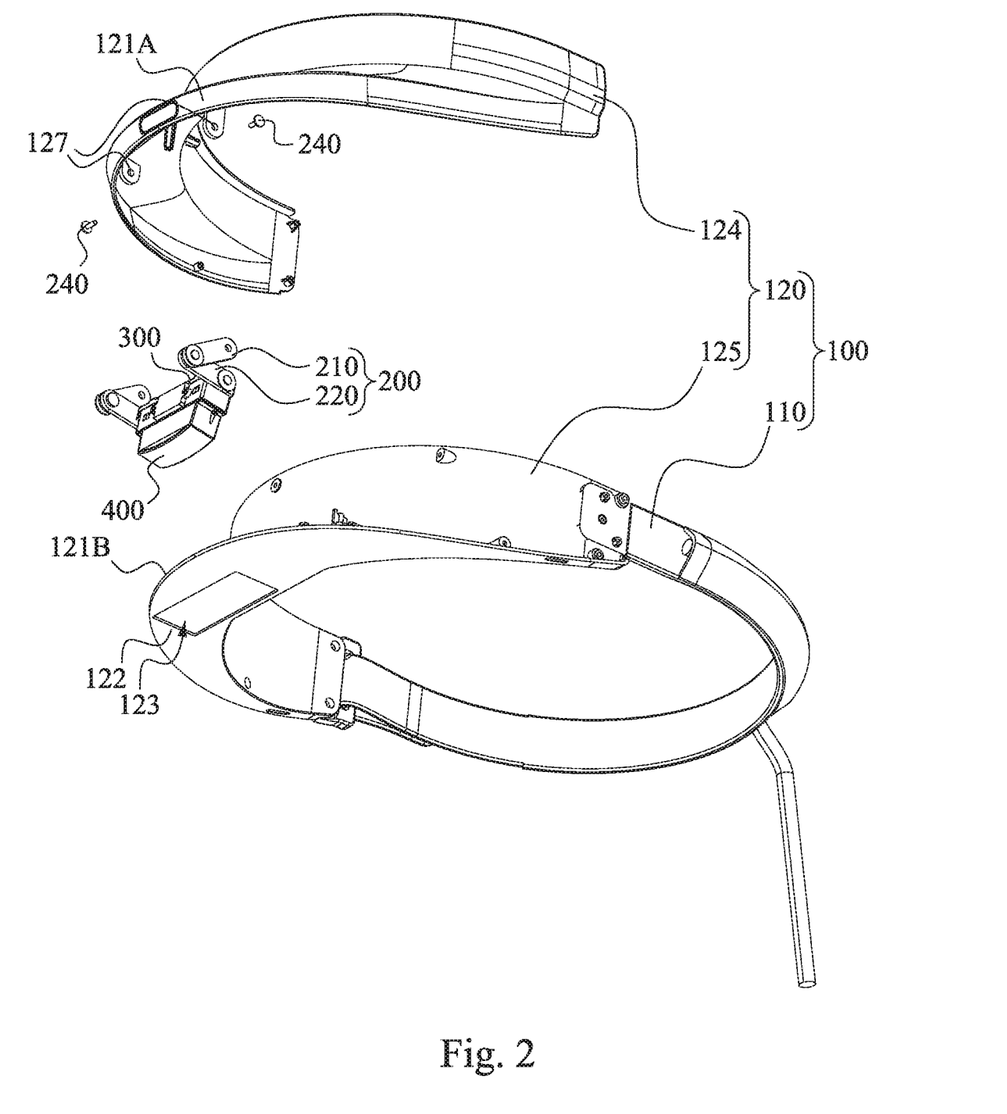
FIG. 2 is an exploded view of the wearable display device of FIG. 1.
Figure 3:
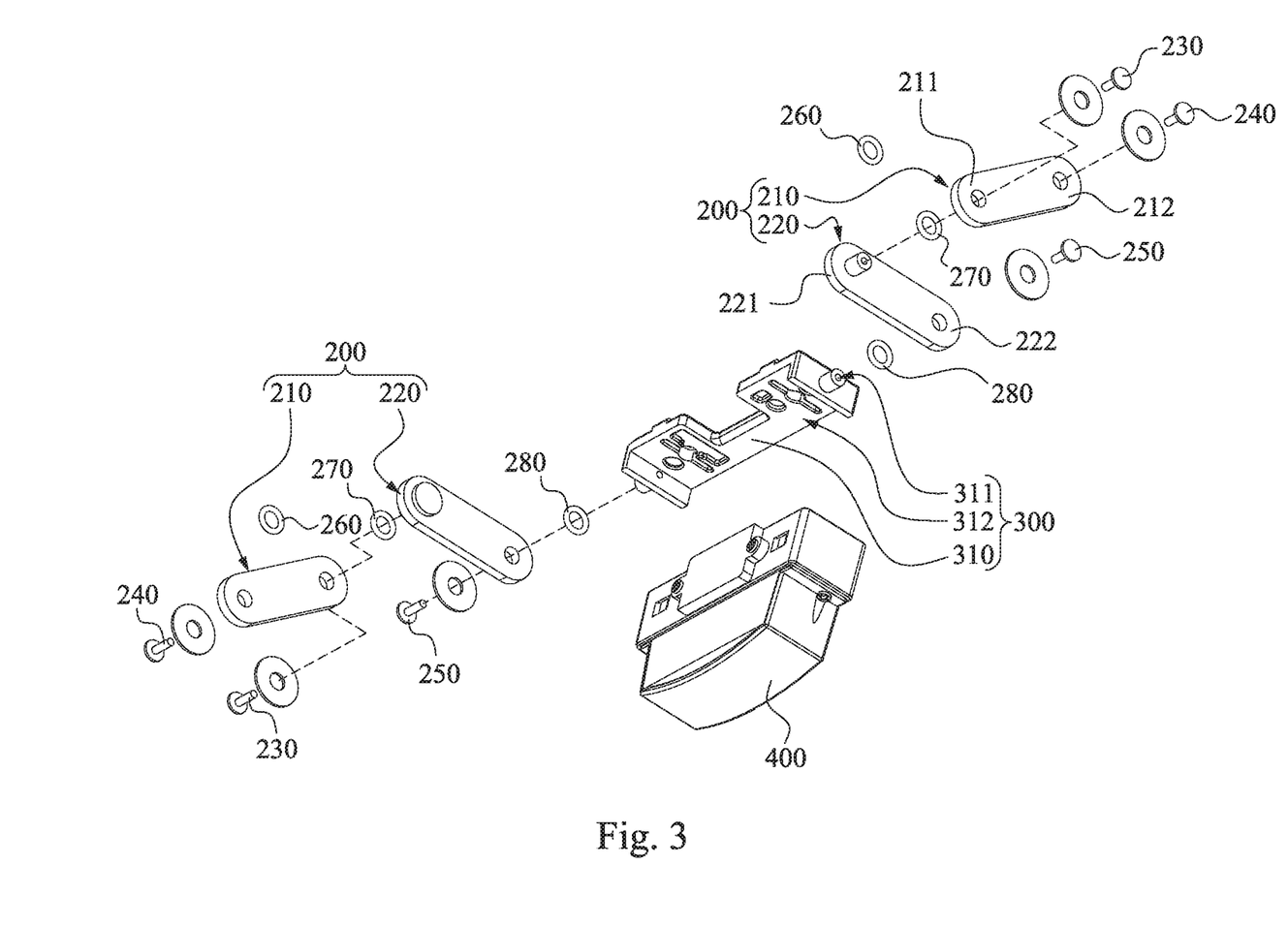
FIG. 3 is an exploded view of the linking-lever set of FIG. 2.

Reference is now made to FIG. 1 to FIG. 3, in which FIG. 1 is a perspective view of a wearable display device 10 according to one embodiment of the disclosure, FIG. 2 is an exploded view of the wearable display device 10 of FIG. 1, and FIG. 3 is an exploded view of the linking-lever set 200 of FIG. 2. As shown in FIG. 1 to FIG. 3, the wearable display device provided includes a wearing device 100, one or more (e.g., two) linking-lever sets 200, a bracket 300 and an optical imaging device 400. The wearing device 100 is used to be worn on a user. These linking-lever sets 200 are located at two opposite sides of the bracket 300, and each of the linking-lever sets 200 includes a first rod 210 and a second rod 220. The first rod 210 is pivotally connected to the wearing device 100 and the second rod 220, respectively. The bracket 300 is fixedly connected to the optical imaging device 400, and pivotally connected to the second rod 220. Thus, the optical imaging device 400 can be moved and rotated relative to a bottom surface 122 of the wearing device 100 by the bracket 300. Therefore, the optical imaging device 400 can be correspondingly adjusted to align with the user's eyes, thereby increasing the willingness of the user to use the device.

In this embodiment, the wearing device 100 is used to be worn on a user's head. For example, the wearing device 100 can be a visor cap that reveals the top of the user's head. However, the disclosure is not limited thereto. In other embodiments, the wearing device may also be a baseball cap that covers the top of the user's head. Specifically, the wearing device 100 includes a wearing portion 110 and a hat body 120. The hat body 120 is connected to the wearing portion 110, and the wearing portion 110 for example is a strip body. The hat body 120 is provided with a hat brim portion 121 that includes an upper hat brim 121A and a lower hat brim 121B. The lower hat brim 121B includes a bottom surface 122 and an opening 123 that is penetrated through the bottom surface 122. For example, the hat body 120 includes an upper case 124 and a lower case 125. The upper case 124 and the lower case 125 are able to combine with each other. The upper hat brim 121A is connected to the upper case 124, and the lower hat brim 121B is connected to the lower case 125. The upper hat brim 121A and the lower hat brim 121B are able to combine with each other so that an accommodating recess 126 (FIG. 6) being in communication with the opening 123 described above is defined between the upper hat brim 121A and the lower hat brim 121B. Each of the linking-lever sets 200 is located in the accommodating recess 126 in which the optical imaging device 400 is projected outwards from the bottom surface 122 of the hat brim portion 121 via the opening 123. The linking-lever sets 200 are located in the accommodating recess 126, and are partially extended outwards from the opening 123.

Figure 4A:
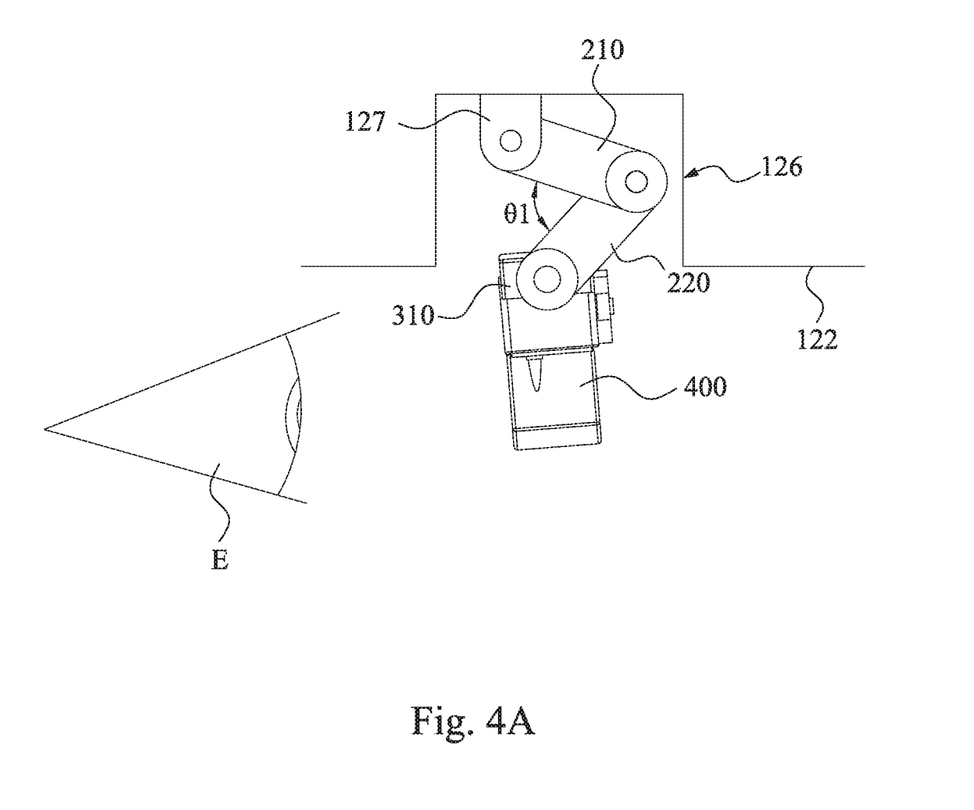
FIG. 4A and FIG. 4B respectively are schematic simple operational views of the optical imaging device of FIG. 1.

As shown in FIG. 2 and FIG. 3, the wearing device 100 is provided with two pivoting bases 127 which are oppositely located within the accommodating recess 126 (FIG. 4A). For example, the pivoting bases 127 are oppositely disposed on the upper case 124. The bracket 300 is provided with a top cover 310 and two pivoting members 311. One side of the top cover 310 is provided with a grasping portion 312. The grasping portion 312 is able to securely hold the optical imaging device 400 so that the optical imaging device 400 can be collectively moved with the bracket 300 synchronously. The pivoting members 311 are protrudingly formed on two opposite ends of the top cover 310. In each of the linking-lever sets 200, the first rod 210 described above includes a first end 211 and a second end 212 which are opposite to each other, and the second rod 220 described above includes a third end 221 and a fourth end 222 which are opposite to each other. The first end 211 of the first rod 210 is pivotally connected to the third end 221 of the second rod 220 through a first pivot shaft 230. The second end 212 of the first rod 210 is pivotally connected to one of the pivoting bases 127 through a second pivot shaft 240, and the fourth end 222 of the second rod 220 is pivotally connected to one of the pivoting members 311 of the bracket 300 through a third pivot shaft 250. Thus, the optical imaging device 400 can be moved and rotated relative to the wearing device 100 by the bracket 300.

Also, each of the linking-lever sets 200 further includes a first cushion ring 260, a second cushion ring 270 and a third cushion ring 280. The first cushion ring 260 is sandwiched between the pivoting base 127 and the first rod 210. The second cushion ring 270 is sandwiched between the first rod 210 and the second rod 220. The third cushion ring 280 is sandwiched between each of the pivoting members 311 and the second rod 220.

Thus, with the frictional forces respectively generated by the first cushion ring 260 on the pivoting base 127 and the first rod 210, the frictional forces respectively generated by the second cushion ring 270 on the first rod 210 and the second rod 220, and/or the frictional forces respectively generated by the third cushion ring 280 on the pivoting member 311 and the second rod 220, each of the linking-lever sets 200 is not easy to be unexpected fallen relative to the pivoting base 127 and the pivoting member 311 due to loosening, thereby maintaining the expected position of the linking-lever sets 200.

However, the disclosure is not limited thereto. One with ordinary skill in the art of the field of the disclosure may choose or omit the mentioned cushion rings according to the limitations and demands.

Although each of the linking-lever sets 200 only has the first rod 210 and the second rod 220, however, the disclosure is not limited thereto, one with ordinary skill in the art of the field of the disclosure may increase the number of the rods to be more than two so that each two adjacent ones of the rods are pivotally connected to each other, and an initial one and a final one of the rods are pivotally connected to the bracket 300 and the pivoting base 127, respectively.

FIG. 4A and FIG. 4B respectively are schematic simple operational views of the optical imaging device 400 of FIG. 1. As shown in FIG. 4A, when a user is desired to operate the optical imaging device 400, since the first rod 210 and the second rod 220 are pivotally connected to each other, the user can rotate the second rod 220 relative to the first rod 210 through the optical imaging device 400 to adjust an included angle θ1 between the first rod 210 and the second rod 220. Accordingly, the position of the optical imaging device 400 can be adjusted at will up and down, and back and forth relative to the user's eye E.

Figure 4B:
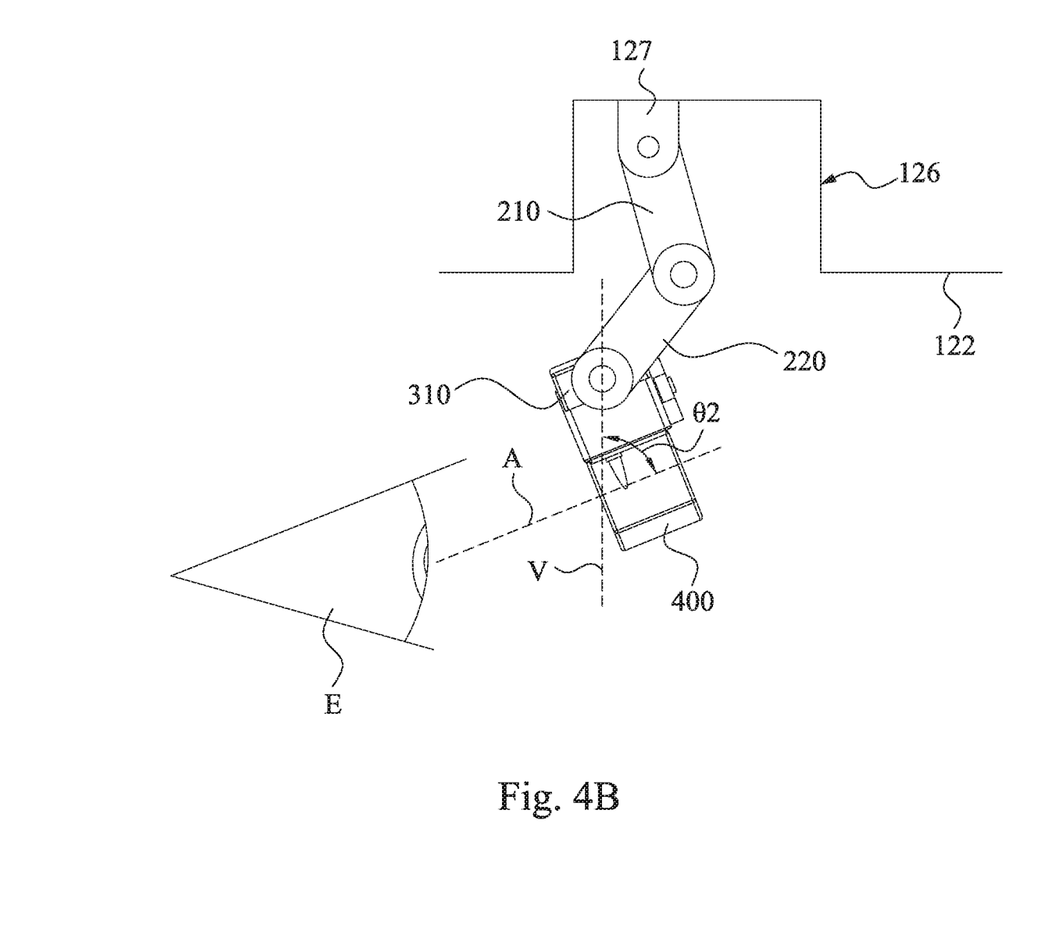

Also, as shown in FIG. 4B, when a user is desired to operate the optical imaging device 400, since the bracket 300 and the second rod 220 are pivotally connected to each other, the user can also rotate the bracket 300 relative to the second rod 220 through the optical imaging device 400 to adjust an angle θ2 between the optical axis A of the optical imaging device 400 and a geographic vertical line V. It should be noted, the user can simultaneously adjust the angle θ1 between the first rod 210 and the second rod 220, and the angle θ2 between the optical axis A of the optical imaging device 400 and the geographic vertical line V.

Figure 5:
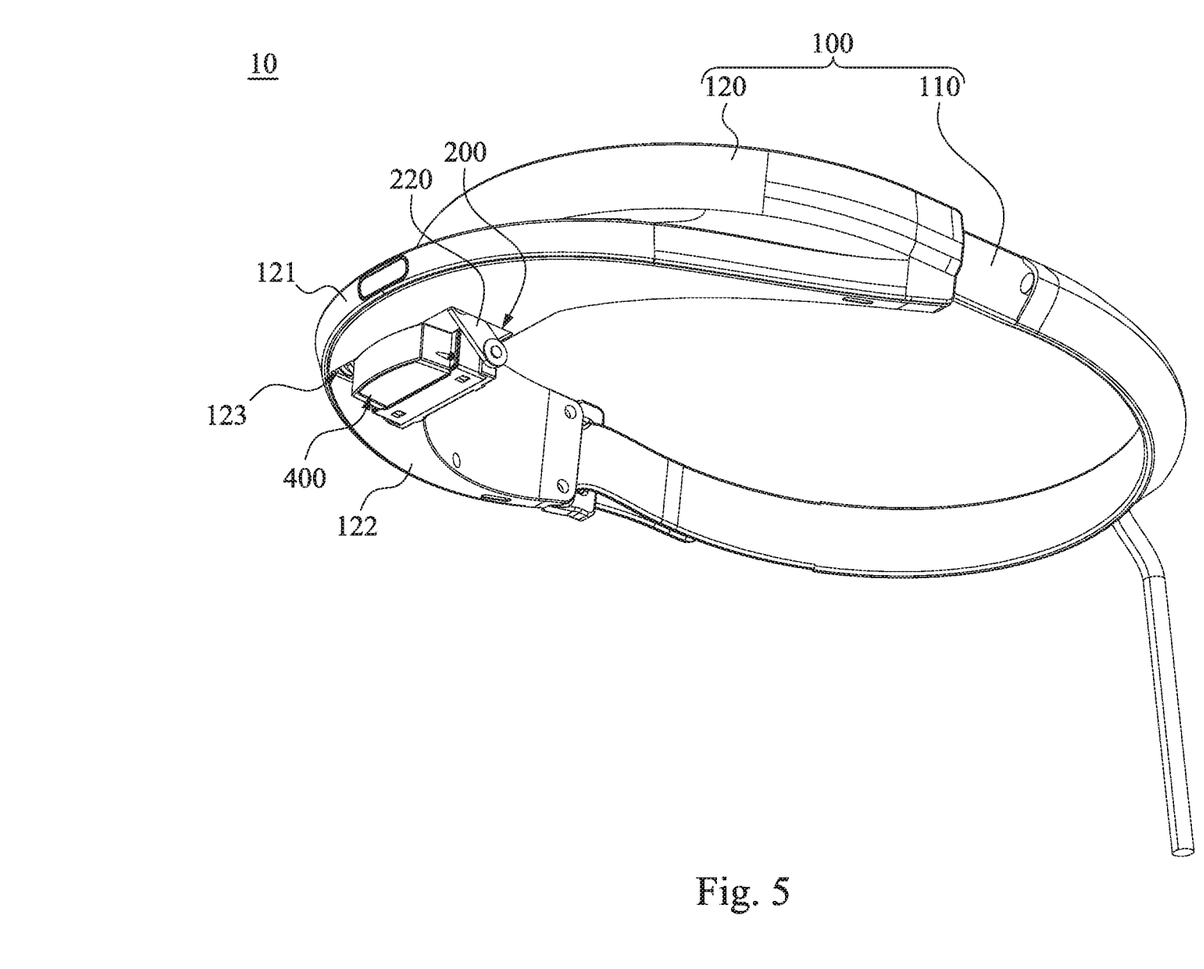
FIG. 5 is a schematic operational view of FIG. 1.

FIG. 5 is a schematic operational view of FIG. 1. As shown in FIG. 5, since the optical imaging device 400 is completely located out of the opening 123 of the hat brim portion 121, thus, when the user is not desired to operate the optical imaging device 400, the optical imaging device 400 can rotate the bracket 300 relative to the second rod 220 so that the optical imaging device 400 can flat contact with the bottom surface 122 of the hat brim portion 121 thereby reducing the degrees of the viewing path of the user being obstructed.

Figure 6:
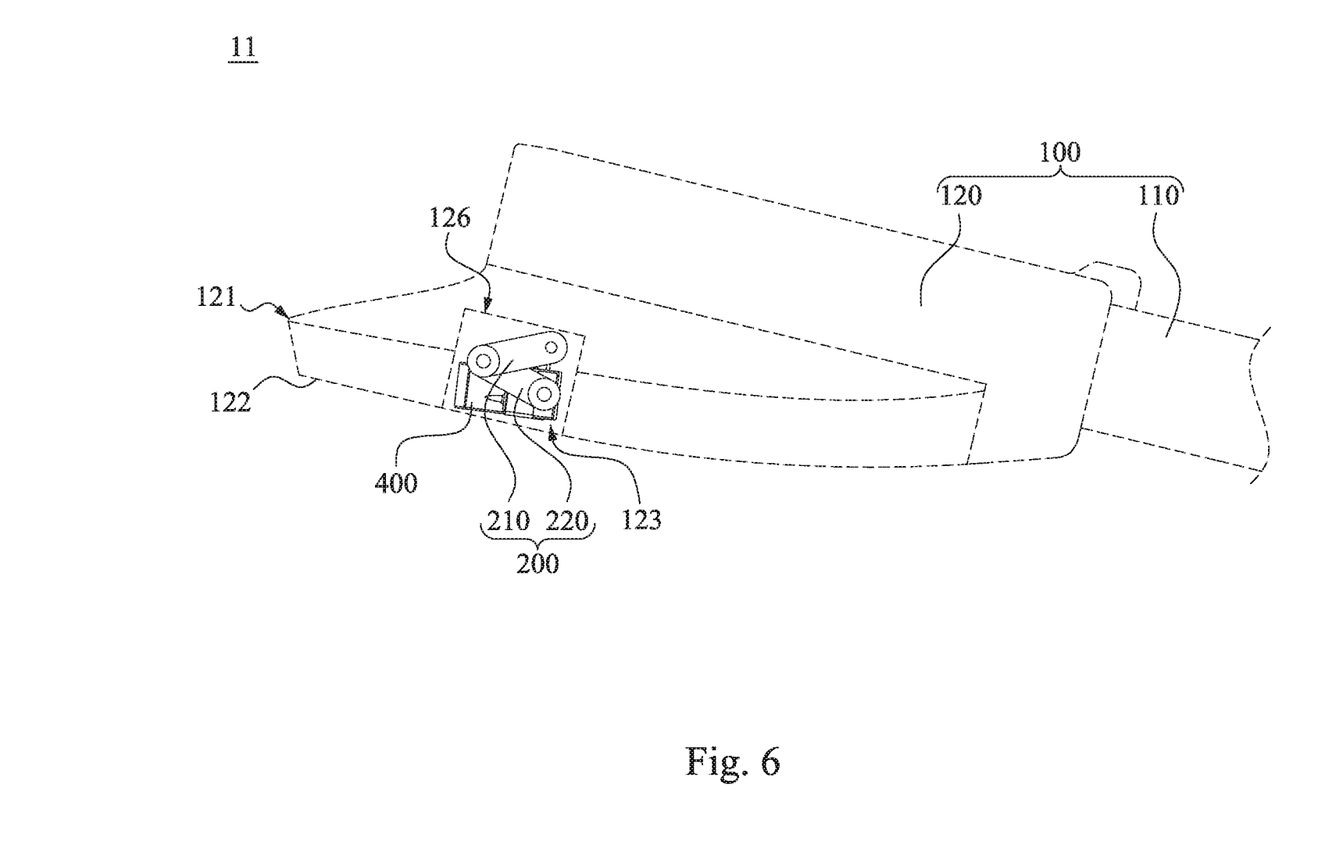
FIG. 6 is a side view of the wearable display device according to one embodiment of the disclosure.

FIG. 6 is a side view of the wearable display device 11 according to one embodiment of the disclosure. As shown FIG. 6, the wearable display device 11 of the embodiment is substantially the same to the wearable display device 10 of FIG. 1. However, at least one difference of the wearable display device 11 of FIG. 7 from the wearable display device 10 of FIG. 1 is that, the optical imaging device 400 is able to be completely moved into the accommodating recess 126 from the opening 123 by the linking-lever set 200 so that the optical imaging device 400 can be completely hidden inside the hat brim portion 121. Thus, when the user does not use the optical imaging device 400, the user can rotate the optical imaging device 400 into the accommodating recess 126 totally for hiding the optical imaging device 400. Thus, not only the degrees of the viewing path of the user being obstructed can be reduced, but also the wearing device 100 can be resumed to a normal hat in the embodiment.

Figure 7:
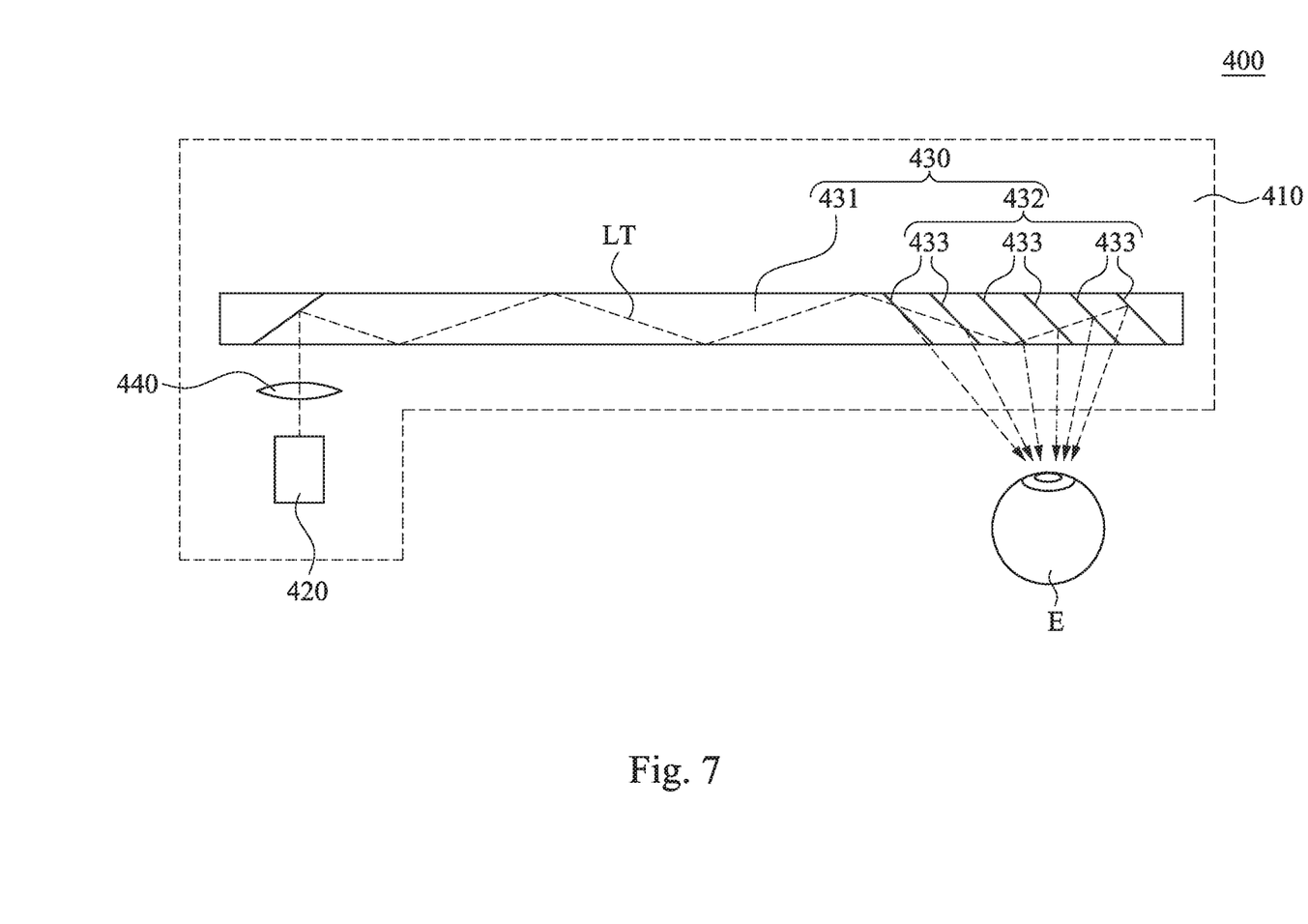
FIG. 7 is a schematic operational view of an optical imaging device according to one embodiment of the disclosure.

FIG. 7 is a schematic operational view of the optical imaging device 400 according to one embodiment of the disclosure. As shown in FIG. 1 and FIG. 7, the optical imaging device described in the above embodiments includes an outer casing 410, a display source 420 and an optical element 430. The outer casing 410 is fixedly connected to the bracket 300. The display source 420 is fixedly connected to the outer casing 410. The optical element 430 includes a light-transmission plate 431 and a waveguide structure 432. The waveguide structure 432 is disposed in the light-transmission plate 431. The light-transmission plate 431 is fixedly connected to the outer casing 410, and optically coupled to the display source 420 for receiving lights LT, and guiding the lights LT into the light-transmission plate 431 and then guiding the lights LT to the waveguide structure 432 through the light-transmission plate 431. The lights LT of the display source 420 can be transmitted into the optical element 430 via lens 440, however, the disclosure is not limited thereto. The waveguide structure 432 is used to guide the lights LT in the light-transmission plate 431 out from one side of the light-transmission plate 431, and to the user's eyes E. The waveguide structure 432 is, for example, a grating structure or a plurality of reflective surfaces 433 arranged in parallel. Also, the display source 420 and the user's eyes E are not limited to face to the same surface or different surfaces of the light-transmission plate 431 respectively; however, the disclosure is not limited thereto.

Therefore, as shown in FIG. 1 and FIG. 7, when the user wears the wearable display device 10 described above, since the hat brim portion 121 is located above the user's eyes E, the optical imaging device 400 located on the bottom surface 122 of the hat brim portion 121 is able to display image information such as text or graphic information above the user's field of view (FOV). Thus, the user's eye E not only can directly view the actual scene in front of the user, but also view the image information through the optical imaging device 400.

In the embodiment, the optical imaging device 400 is a monocular display. The optical imaging device 400 also can be known as an LCoS (liquid crystal on silicon) display or a near-eye display (NED). For example, the size and the position of the optical imaging device 400 are designed to be suitable to align with single one of human eyes (e.g., the left eye) of the user for providing images for the specific eye only. However, the disclosure is not limited to aligning the user's left, right or both eyes. Since the size of the optical imaging device 400 is set appropriately, the user's sight will not be blocked. Thus, the user's eye can view the actual scene in front of the user and the image content message of the optical imaging device 400 simultaneously.

Although the disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. A wearable display device, comprising:
an optical imaging device;
a wearing device having a wearing portion and a hat body, the hat body being connected to the wearing portion and being provided with a hat brim portion and an opening formed on a bottom surface of the hat brim portion;
at least one linking-lever set, each of the at least one linking-lever set comprising a first rod and a second rod, and the first rod being pivotally connected to the wearing device and the second rod; and
a bracket fixedly connected to the optical imaging device and pivotally connected to the second rod, wherein
the at least one linking-lever set is located in the opening, and the optical imaging device projects outwards from the bottom surface of the hat brim portion through the opening.

2. The wearable display device of claim 1, wherein the optical imaging device is configured to project outwards from the bottom surface of the hat brim portion through the opening, so as to be rotated for flat contacting with the bottom surface of the hat brim portion.

3. The wearable display device of claim 1, wherein
an accommodating recess is formed in the hat brim portion, and coincides with the opening of the hat body, and
the optical imaging device is able to be completely moved into the accommodating recess from the opening by the at least one linking-lever set.

4. The wearable display device of claim 1, wherein the bracket is provided with a pivoting member, the wearing device is provided with a pivoting base, the first rod comprises a first end and a second end which are opposite to each other, the second rod comprises a third end and a fourth end which are opposite to each other,
wherein the first end of the first rod is pivotally connected to the third end of the second rod through a first pivot shaft, the second end of the first rod is pivotally connected to the pivoting base through a second pivot shaft, and the fourth end of the second rod is pivotally connected to the pivoting member through a third pivot shaft.

5. The wearable display device of claim 4, wherein each of the at least one linking-lever set further comprises:
a first cushion ring sandwiched between the pivoting base and the first rod; and
a second cushion ring sandwiched between the first rod and the second rod.

6. The wearable display device of claim 5, wherein each of the at least one linking-lever set further comprises:
a third cushion ring sandwiched between the pivoting member and the second rod.

7. The wearable display device of claim 1, wherein
the at least one linking-lever set comprises two linking-lever sets, and
the two linking-lever sets are respectively located on two opposite sides of the bracket.

8. The wearable display device of claim 1, wherein the optical imaging device comprises:
an outer casing fixedly connected to the bracket;
a display source fixedly connected to the outer casing; and
an optical element comprising:
a light-transmission plate fixedly connected to the outer casing, and optically coupled to the display source; and
a waveguide structure disposed in the light-transmission plate,
wherein the light-transmission plate is configured to guide lights of the display source to the waveguide structure, and the waveguide structure is configured to guide the lights in the light-transmission plate out from the light-transmission plate.

9. A wearable display device, comprising:
a wearing device having a pivoting base, an accommodating recess and an opening formed on a bottom surface of the wearing device, wherein the opening coincides with the accommodating recess;
a bracket;
an optical imaging device fixedly connected to the bracket, and projecting outwards from the bottom surface of the wearing device through the opening; and
a linking-lever set located in the accommodating recess, and extending outwards from the opening, the linking-lever set comprising at least two rods, wherein
each of the at least two rods is pivotally connected to another of the at least two rods adjacent thereto, and
the at least two rods includes an initial rod pivotally connected to the bracket and a final rod pivotally connected to the pivoting base.

* * * * *